(12) United States Patent  
Hunt et al.

(10) Patent No.: US 12,462,683 B2  
(45) Date of Patent: Nov. 4, 2025

(54) SYSTEM AND METHOD FOR GENERATING REAL-TIME ROUTING FOR ON-DEMAND TRANSPORTATION

(71) Applicant: BLAISE TRANSIT LTD., Longueuil (CA)

(72) Inventors: Justin Hunt, Longueuil (CA); Benjamin Hudson, Waterloo (CA); Samuel Pelletier, Montreal (CA)

(73) Assignee: BLAISE TRANSIT LTD., Longueuil (CA)

( * ) Notice: Subject to any disclaimer, the term of this patent is extended or adjusted under 35 U.S.C. 154(b) by 318 days.

(21) Appl. No.: 18/019,976

(22) PCT Filed: Aug. 6, 2021

(86) PCT No.: PCT/CA2021/051098  
§ 371 (c)(1),  
(2) Date: Feb. 6, 2023

(87) PCT Pub. No.: WO2022/027144  
PCT Pub. Date: Feb. 10, 2022

(65) Prior Publication Data  
US 2023/0290249 A1  Sep. 14, 2023

Related U.S. Application Data

(60) Provisional application No. 63/062,577, filed on Aug. 7, 2020.

(51) Int. Cl.  
*G08G 1/0968* (2006.01)  
*G01C 21/34* (2006.01)  
(Continued)

(52) U.S. Cl.  
CPC ... *G08G 1/096816* (2013.01); *G01C 21/3407* (2013.01); *G01C 21/3453* (2013.01);  
(Continued)

(58) Field of Classification Search  
CPC .. G08G 1/096816; G08G 1/202; G08G 1/205; G06Q 50/40; G06Q 10/02; G01C 21/3407; G01C 21/3453  
(Continued)

(56) References Cited

U.S. PATENT DOCUMENTS 9,562,785 B1   2/2017  Racah et al.  
9,733,625 B2 *  8/2017  Kumar ............... B61L 15/0058  
(Continued)

FOREIGN PATENT DOCUMENTS

AU   2018210259 A1 *  8/2019  ....... G06Q 10/06315  
AU   2021269447 A1 * 12/2021  ....... G06Q 10/08355  
(Continued)

OTHER PUBLICATIONS

Ghoseiri, Keivan. "Dynamic Rideshare Optimized Matching Problem." ProQuest Dissertations & Theses, 2012. Print. (Year: 2012).*  
(Continued)

*Primary Examiner* — Ramya P Burgess  
*Assistant Examiner* — Keith A von Volkenburg  
(74) *Attorney, Agent, or Firm* — Barnes & Thornburg LLP; Steven D. Shipe (57) ABSTRACT

A method and a system for generating, in real time, a dynamic routing plan for a fleet of vehicles is provided. The method is performed by one or more processors and comprises receiving trip or transport requests from a plurality of processing devices, generating routes for a fleet of vehicles, and continuously updating and/or deleting uncommitted segments of the routing plan and/or adding new routes to the routing plan, to minimize an objective function value of the routing plan, which is based on a combination of operating costs of the vehicles and service quality metrics.

19 Claims, 4 Drawing Sheets

(51) Int. Cl.
*G06Q 10/02* (2012.01)
*G06Q 50/40* (2024.01)
*G08G 1/00* (2006.01)

(52) U.S. Cl.
CPC ............. *G06Q 10/02* (2013.01); *G06Q 50/40* (2024.01); *G08G 1/202* (2013.01); *G08G 1/205* (2013.01)

(58) Field of Classification Search
USPC ........................................................ 701/400
See application file for complete search history.

(56) References Cited

U.S. PATENT DOCUMENTS

| | | | |
|---|---|---|---|
| 10,235,888 | B2 | 3/2019 | Lambert et al. |
| 11,386,791 | B2* | 7/2022 | Thakur ................. G05D 1/227 |
| 11,636,405 | B2* | 4/2023 | Atanasiu ............ G01C 21/3438 701/533 |
| 12,093,882 | B2* | 9/2024 | Scharaswak ....... G06Q 10/0835 |
| 2012/0253654 | A1 | 10/2012 | Sun et al. |
| 2019/0108468 | A1* | 4/2019 | Nguyen ............. G01C 21/3438 |
| 2020/0104770 | A1* | 4/2020 | Aich ..................... A61G 3/0808 |
| 2020/0225049 | A1* | 7/2020 | Balva .................. G06Q 10/047 |
| 2020/0249025 | A1* | 8/2020 | Ho .......................... G01C 21/20 |
| 2020/0249047 | A1* | 8/2020 | Balva ................. G01C 21/3438 |
| 2021/0142248 | A1* | 5/2021 | Balva ..................... G08G 1/202 |

FOREIGN PATENT DOCUMENTS

| | | | |
|---|---|---|---|
| CN | 108932862 A | 12/2018 | |
| CN | 110555473 A | 12/2019 | |
| CN | 110598971 A | 12/2019 | |
| CN | 111815189 A | 10/2020 | |
| GB | 2501075 A | * 10/2013 | ............. G08G 1/202 |

OTHER PUBLICATIONS

Search Report and Written Opinion issued in Appl No. PCT/CA2021/051098 (Nov. 11, 2021).

* cited by examiner

SYSTEM AND METHOD FOR GENERATING REAL-TIME ROUTING FOR ON-DEMAND TRANSPORTATION

This application is a U.S. nationalization under 35 U.S.C. § 371 of International Application No. PCT/CA2021/051098, filed Aug. 6, 2021, which claims the benefit of priority under 35 U.S.C. § 119 (e) to U.S. Provisional Patent Application No. 63/062,577, filed Aug. 7, 2020; the disclosures set forth in each of which are incorporated herein by reference in their entireties.

TECHNICAL FIELD

The present invention generally relates to the field of on-demand transportation systems and methods.

BACKGROUND

The passenger transportation industry underwent major transformation in the last decade, with the advent of companies such as Uber™ and Lyft™, which helped modernize and increase transportation options for individuals. However, the service offered by public transport utilities and high-capacity vehicle operators has remained largely unchanged, where individuals still need to plan their rides according to fixed bus schedules and routes.

There is a need for improving mass transportation services, such as by making them more convenient for the passengers and more cost efficient for operators.

SUMMARY

According to an aspect, a method is provided for generating, in real time, a dynamic routing plan for a fleet of multi-passenger vehicles. The method comprises receiving new trip requests from a plurality of passenger processing devices, each new trip request comprising trip parameters including an origin location, a destination location and at least one of an earliest departure time and a latest arrival time. The method further comprises generating a routing plan for the fleet, the routing plan including routes for one or more of the multi-passenger vehicles, each route comprising an ordered list of route stops and at least one of an arrival time and a departure time associated with each route stop, the routing plan being generated based on the trip parameters of the new trip requests and on trip parameters of previously accepted trip requests and being further based on operator-specific parameters. The method further comprises individually accepting, after a first period associated with each new trip request, a given one of said new trip requests when a routing plan accommodating the trip parameters thereof is generated, updating the routing plan to minimize an objective function representative of a relevance of the routing plan, the objective function being calculated based on at least one of the operating costs and service quality metrics, and transmitting, after a second period associated with each accepted trip request, to a passenger processing device associated with the accepted trip request, trip details according to the routing plan, the trip details comprising a pickup stop, a pickup time, a drop-off stop, a drop-off time, and a vehicle identification, whereby waiting after the second period to transmit the trip details to the passenger processing devices allows for improving the dynamic routing plan. The routing plan further comprises committed elements including at least the trip details transmitted after the second period, wherein the committed elements are unmodifiable when generating and updating the routing plan.

In some implementations, the method further comprises transmitting, to each of vehicle processing devices associated with the fleet of multi-passenger vehicles, routing information comprising route segments and stops of the routes to be traversed by the multi-passenger vehicles including at least a next stop to be visited. The committed elements further comprise transmitted routing information.

In some implementations, generating the routing plan comprises generating an initial routing plan accommodating the trip parameters of the new trip request and respecting the operator-specific parameters while accommodating all the trip parameters of the previously accepted trip requests, the initial routing plan leaving all executed route segments and the committed elements unmodified, the executed segments corresponding to route segments traversed by the multi-passenger vehicles.

In some implementations, when the given one of the new trip requests is accepted, an acceptance notice is transmitted to the passenger processing device associated with the new trip request, and wherein when no routing plan accommodating the trip parameters of the new trip request can be generated, a refusal notice is transmitted to the passenger processing device.

In some implementations, when no routing plan accommodating the trip parameters of the new trip request can be generated, the trip parameters of the new trip request are modified allowing for generating, during the first period, a routing plan accommodating modified trip parameters of the new trip request. The acceptance notice is transmitted when a routing plan accommodating the modified trip parameters of the new trip request is generated, the acceptance notice including an indication that the trip parameters have been modified. The refusal notice is transmitted when no routing plan accommodating the modified trip parameters of the new trip request can be generated.

In some implementations, the first period starts after a new trip request has been received and ends after one of the acceptance notice and the refusal notice has been transmitted to the passenger processing device, the first period being different for each new trip request.

In some implementations, the second period starts after the acceptance notice has been transmitted to the passenger processing device and ends at a given time before the pickup time.

In some implementations, the given time corresponds to the earliest departure time.

In some implementations, updating the routing plan comprises at least one of modifying uncommitted elements of existing routes of the routing plan, creating new routes, and deleting old routes comprising unexecuted segments and uncommitted elements, the unexecuted segments corresponding to route segments untraversed by the multi-passenger vehicles.

In some implementations, updating the routing plan further comprises evaluating an objective function of each of a plurality of alternate routing plans comprising one or more alternate routes, and updating the uncommitted elements of the routing plan with one or more alternate routes of one of the alternate routing plans when a value of the objective function of the one of the alternate routing plans is lower than a value of the objective function of the routing plan and the one of the alternate routing plans accommodates trip parameters of all accepted trip requests and respects the operator-specific parameters.

In some implementations, the one of the alternate routing plans accommodates the trip parameters of all the accepted trip requests when pickup stops and drop-off stops are within a predetermined distance and/or travel time from origin locations and destination locations associated with all the accepted trip requests, and when arrival time at and/or departure time from each of the route stops correspond with earliest departure time from and/or latest arrival time of trip requests associated to the route stops.

In some implementations, updating the routing plan further comprises iteratively updating the uncommitted elements of the routing plan before the end of the second period by modifying at least one of a pickup stop, a drop-off stop, a pickup time, a drop-off time, an ordered list of route stops, and a multi-passenger vehicle associated to one or more routes.

In some implementations, updating the routing plan is performed continuously.

In some implementations, generating the route plan further comprises identifying, for each of the new and accepted trip requests, a subset of pickup stops and a subset of drop-off stops from a plurality of candidate stops, the subset of pickup stops and the subset of drop-off stops being within the predetermined distance and/or travel time from the origin location and the destination location, respectively, of the trip request, and generating therefrom the routing plan, the subset of pickup stops and the subset of drop-off being used to generate alternate routing plans.

In some implementations, a heuristic algorithm framework is used for generating and updating the routing plan.

In some implementations, updating the uncommitted elements of the routing plan is performed by iteratively changing current routes of the routing plan, removing the current routes of the routing plan and/or creating new routes using selected destroy-and-repair algorithm operators.

In some implementations, a selection process of the different destroy-and-repair algorithm operators for changing the current routes, removing the current routes and/or creating the new routes plan, is stochastic and is updated after given number of iterations is reached and/or based on a state of the routing plan.

In some implementations, updating the uncommitted elements of the routing plan further comprises applying at least one local search operator for refining the routing plan.

In some implementations, the operator-specific parameters comprise at least one of time-based operating costs of the multi-passenger vehicles and/or of associated drivers, distance-based operating costs of the multi-passenger vehicles and/or of the associated drivers, working shifts of the associated drivers, break schedules of the associated drivers, overhead costs of dispatching a new multi-passenger vehicle, geographic area of a transport operator associated to the fleet of multi-passenger vehicles, a number of multi-passenger vehicles in the fleet, a capacity associated to each of the multi-passenger vehicles, and transit network data.

In some implementations, the pickup stops and the drop-off stops are predetermined fixed bus stops assigned to a transport operator associated to the fleet of multi-passenger vehicles.

According to a second aspect, a non-transitory storage medium is provided, storing processor-readable software instructions thereon that when executed by a processor, performs the steps according to any implementation and aspect described herein.

According to a third aspect, system for determining, in real time, a dynamic routing plan for a fleet of multi-passenger vehicles is provided. The system comprises one or more servers comprising an application interface configured to receive new trip requests from a plurality of passenger processing devices, each new trip request comprising trip parameters including an origin location, a destination location and at least one of an earliest departure time and a latest arrival time. The one or more servers further comprises an operator-dashboard interface for inputting operator-specific parameters, the operator-specific parameters including at least operating costs of the multi-passenger vehicles and a route planning module for generating a routing plan for the fleet, each route in said routing plan comprising at least a list of route stops to visit, an arrival time and/or a departure time at each route stop, each route in said routing plan being generated based on the trip parameters of the new trip requests and on trip parameters of previously accepted trip requests, each route being further based on operator-specific parameters, the operator-specific parameters including at least operating costs of the multi-passenger vehicles. The application interface is configured for sending, after a first period associated with each new trip request, notices to the passenger processing devices, acceptance notices being sent when a routing plan accommodating the trip parameters and the operator-specific parameters can be generated. The route planning module is configured for updating the routing plan to minimize at least an objective function associated with the routing plan and being indicative of a relevance of the routing plan, the objective function being calculated based on at least one of the operating costs and service quality metrics. The application interface is configured for sending, after a second period associated to each accepted trip request, to the processing devices associated with the accepted trip request, trip details associated with the most recently updated routing plan, the trip details comprising a pickup stop, a pickup time, a drop-off stop, a drop-off time, and a vehicle identification, for example. The routing plan further comprises committed elements including at least the trip details transmitted after the second period, wherein the committed elements are unmodifiable when generating and updating the routing plan.

In some implementations, the system further comprises a mobile application executable by the plurality of passenger processing devices. The mobile application comprises a passenger interface configured for inputting the trip parameters of the trip request including the origin location, the destination location and at least one of the earliest departure time and the latest arrival time, for displaying the acceptance notices and the refusal notices, and for displaying the trip details comprising the pickup stop, the pickup time, the drop-off stop, the drop-off time, and the vehicle identification.

In some implementations, the system further comprises a vehicle application with a driver interface for each of the multi-passenger vehicles, configured for displaying routing information comprising at least a next stop along a route associated to the multi-passenger vehicle and a route segment indicating roads to follow to reach a given stop, as well as the arrival time and/or the departure time at the stops, wherein the committed elements further comprise the routing information transmitted to the vehicle application for displaying on the driver interface.

In some implementations, the system further comprises a database in communication with the route planning module, the application interface, the vehicle application, and the operator-dashboard interface, for storing at least one of the trip parameters, the operator-specific parameters, the acceptance and refusal notices, the trip details, and the routing information associated to each of the multi-passenger vehicles.

In some implementations, the route planning module uses a heuristic framework for generating the routes of the routing plan, destroy-and-repair algorithm operators, and local search operators for iteratively updating unexecuted segments and uncommitted elements of the routing plan, the unexecuted segments corresponding to route segments untraversed by the multi-passenger vehicles and the uncommitted elements corresponding to route segments, stops, and trip details not transmitted.

According to another aspect, a method is provided for generating, in real time, a dynamic routing plan for a fleet of vehicles. The method is performed by one or more processors and comprises receiving transport requests from a plurality of client processing devices, each transport request comprising transport parameters including a pickup location, a drop-off location and at least one of an earliest pickup time and a latest drop off time. The method further comprises generating a routing plan for the fleet, the routing plan including routes for at least some of the vehicles, each route comprising a list of route stops to visit, an arrival time and/or a departure time at each route stop, each route being generated based on the transport parameters of the transport requests, and being further based on operator-specific parameters, the operator-specific parameters including at least operating costs of the vehicles. The method further comprises individually accepting the transport requests, after a first period associated with each transport request when a routing plan meeting requirements for the transport parameters and the operator-specific parameters could be found. The method further comprises iteratively updating the routing plan in order to minimize the operating costs of the vehicles while travelling along the routes and sending, after a second period associated with each transport request, to the client processing devices associated to accepted transport requests, transport details associated with the updated routing plan, the transport details comprising a pickup stop, a pickup time, a drop-off stop, a drop-off time, and a vehicle identification, whereby waiting after the second period to communicate trip details to the processing devices allows more leeway to continuously improve the dynamic routing plan.

In some implementations, the transport requests are requests for package pickup and delivery.

According to another aspect, a method for generating, in real time, a dynamic routing plan for a fleet of vehicles managed by a transport operator is provided. The method is similar to the one described above, but deals with transport requests of all types, such as for parcel delivery. The requests sent to the system are thus "transport" requests instead of being "trip requests", and the transport requests include transport parameters, including for example pickup and drop off locations and times.

Other features and advantages of the embodiments of the present invention will be better understood upon reading of preferred embodiments thereof with reference to the appended drawings.

It should be noted that the appended drawings illustrate only exemplary embodiments of the invention and are therefore not to be construed as limiting of its scope, for the invention may admit to other equally effective embodiments.

DETAILED DESCRIPTION

According to an aspect, the proposed system and method aim to solve the inefficiency and poor user experience of mass transportation services that use multi-passenger vehicles, such as town and coach buses, running on fixed routes and schedules. The proposed system and method aim to improve these mass transportation services by making them more cost efficient for operators and more convenient for passengers. According to another aspect, the proposed system and method aim to provide a more efficient way of determining dynamic routing plans for a fleet of vehicles of all types, for different applications, including for example package delivery. Further, the proposed method improves the functioning of computers and processors in determining dynamic routing plans, as will be described herein.

In the present description, the terms "multi-passenger vehicles" or "high-capacity vehicles" encompass all types of self-propelled road vehicles configured to carry more passengers than private automobiles. Generating routing plans for multi-passenger vehicles still presents challenges, given that passengers on the same vehicle may onboard and off-board from different origin and destination points, and also given that pickup/drop-off stops, as well as routes that can be used, are more restricted for multi-passenger vehicles than for regular cars.

In the present description, "a routing plan" refers to the collection of all routes to be executed by a fleet of multi-passenger vehicles, at a given time. A dynamic routing plan is a routing plan that is continuously, iteratively, or sporadically updated or modified during the operating hours of the fleet. A dynamic routing plan comprises the different routes to be travelled or traversed by the multi-passenger vehicles, where entire routes or segments of routes can be modified, deleted or added. A route comprises different route segments, with ordered route stops to pickup or drop off passengers, and with arrival and departure times at each route stop. A route also comprises an itinerary to follow in between the route stops. A route may additionally comprise stops unrelated to passenger pickups and drop-offs, such a stops associated to a driver break location, or associated to a waiting area.

In the present description, the term "committed element" refers to routing information, such as route segments and stops, or trip details of the routing plan that are fixed and cannot be modified or deleted when attempting to improve the routing plan as having been transmitted to vehicle processing devices and/or passenger processing devices. Committed elements include, for example, trip details transmitted to a passenger processing device after a second period described below, the next one or more planned next stops on a route of the routing plan transmitted to a vehicle processing device, and route segments transmitted to the vehicle processing device, indicating roads to follow to reach the stops and associated to the next one or more planned next stops. For example, a vehicle processing device may display a given number of next stops along the route of the multi-passenger vehicle associated with the vehicle processing device. Therefore, the details of the given number of next stops are transmitted to the vehicle processing device. Further, the route segment associated to reaching a next stop, including directions for example, is also transmitted. Therefore, the given number of next stops and the route segment, together the routing information, are committed elements. Further, trip details related to a trip request must be transmitted to a passenger in preparation of the trip, and the transmitted trip details are therefore committed as they cannot be modified. However, it will be noted that in some embodiments, it is possible that transmitted trip details are not considered committed elements, such as when transmitting trip details before the end of the second period described below. For example, giving a "head's up" to a passenger regarding a trip request may include sending preliminary trip details. Those trip details are not committed elements because they may still be modified. In the present description, such trip details are referred to as "preliminary trip details". Similarly, routing information, such as stops and route segments, may be transmitted to the vehicle processing devices without being committed elements. For example, all the stops and associated route segments of a route may be transmitted to a vehicle processing device to provide a head's up or a preview of a large portion or the entirety of the planned route to a driver, without committing to the entire route. In the present description, this information is referred to as "preliminary routing information". In such embodiments, only the next given number of stops, and a route segments for reaching the next stop on the route, may be committed elements.

Generally, the dynamic routing plan generation system is configured for generating in real time dynamic routing plans to direct multi-passenger vehicles on the routing plan, based on trip requests inputted by passengers, through a passenger mobile application. The passenger mobile application can be downloaded on the passenger processing devices, such as on their smart phones, tablets or computers. The dynamic routing plan generation system uses a route planning module for generating the dynamic routing plan.

The route planning module comprises dynamic routing algorithms as trip requests are received in real time throughout the day, and the routes and schedules are created, updated, and executed by the multi-passenger vehicles in real time as well. By "real time" it is meant that the system processes requests as they are received, and that the determination of the routing plan is a continuous process. It will also be noted that in other applications, such as for parcel delivery, a "request" can be a "transport" request.

Figure 1:
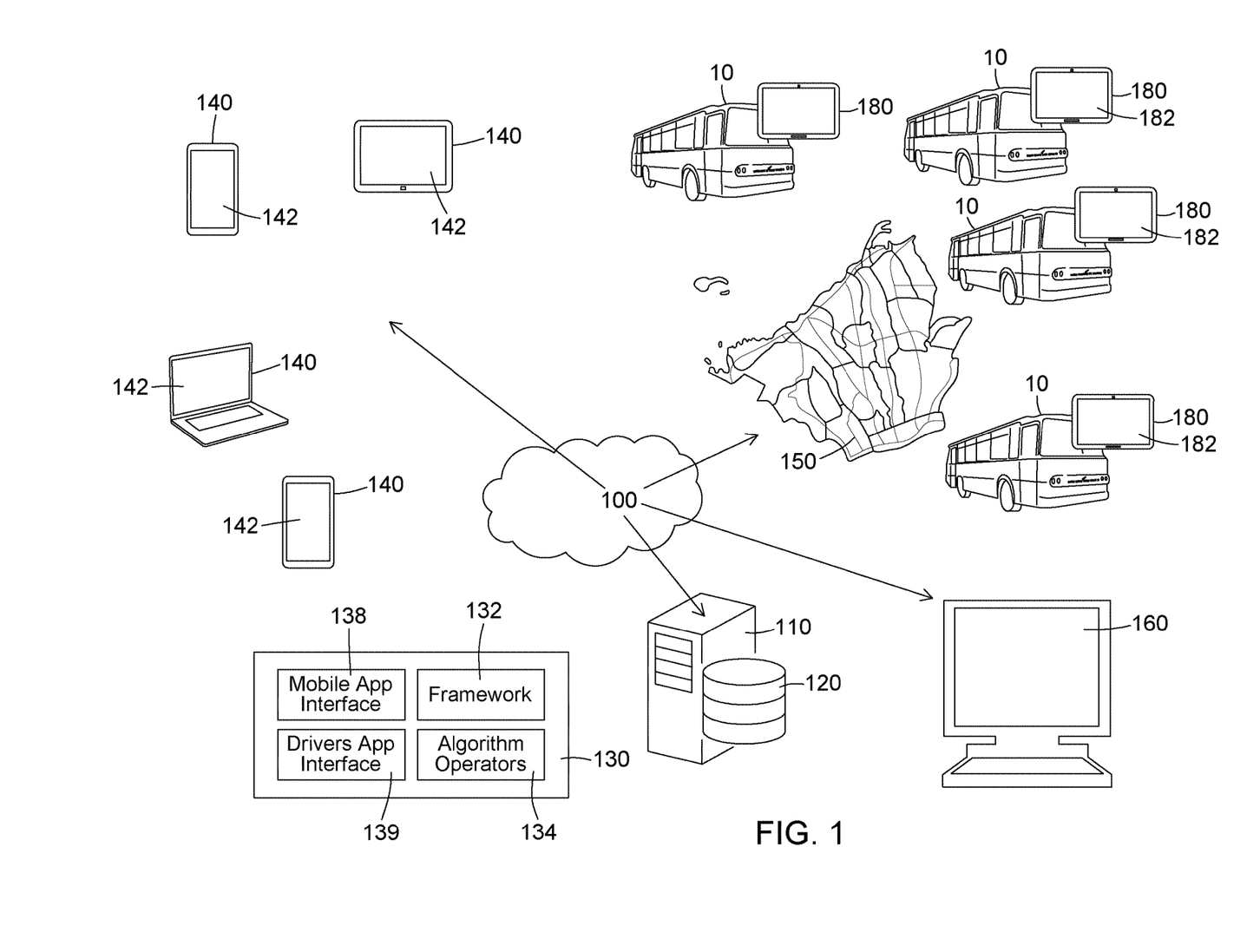
FIG. 1 is a block diagram of possible components of a system for determining, in real time, a dynamic routing plan for a fleet of multi-passenger vehicles managed by a transport operator, according to a possible implementation.

Referring to FIG. 1, the dynamic routing plan generation system 100 comprises a route planning module 130, provided as the core of the system. The route planning module 130 receives trip requests, using a mobile application interface 138, from the passenger processing devices 140 associated to different passengers, and outputs a routing plan 150, comprising routes and schedules, for which details can be transmitted to the passenger processing devices 140 and vehicle processing devices 180 associated to multi-passenger vehicles 10 of the fleet using the mobile application interface 138 and a driver application interface 139, respectively. The mobile application interface 138 is configured for communicating with the passenger processing devices 140 via a vehicle application 182, and similarly the driver application interface 139 is configured for communicating with the vehicle processing devices 180 via a vehicle application 182. Passengers receive, via their passenger mobile application 142, a pickup location and time, and a drop-off location and time, and information relating to the vehicle that will serve their trip. In possible implementations, the pickup locations can be predetermined fixed bus stops served by service operators. The predetermined fixed bus stops can comprise pre-existing bus stops and further coordinates added as additional bus stops along with pre-existing bus stops. The drivers of the multi-passenger vehicles also receive, through a vehicle application 182, details of the route to follow. The dynamic routing plan generation system 100 also comprises an operator-dashboard application and/or interface 160, through which service operators can set operating conditions of the system, by specifying, for example, the territory served by their fleet, the operating hours, the driver's shifts, the type and number of vehicles of the fleet, etc., as will be explained in more detail below. The dynamic routing plan generation system 100 further comprises one or more servers 110 storing thereon the route planning module 130. The one or more servers 110 additionally stores the mobile application interface 138 and the driver application interface 139, which can both be integrated to the route planning module 130 or operatively connected therewith. In some embodiments, the one or more servers 110 additionally stores the operator-dashboard interface 160.

Each trip request comprises different parameters, referred to as "trip parameters," including at least an origin location and a destination location. A location can be provided in different ways, such as by inputting a physical address, an intersection, or geographical coordinates, as examples only. The trip parameters also preferably comprise at least one of the earliest time a passenger can depart from the origin location and the latest time the passenger can arrive at the destination location. The trip parameters may also include additional parameters, such as the number of passengers associated to a trip request, or, in other words, the number of "seat(s)" or "demands" required on the multi-passenger vehicle.

Based on the flow of trip requests received, routes and schedules are determined for each multi-passenger vehicle in service in a given fleet of multi-passenger vehicles. The route planning module 130 generates a routing plan 150 comprising routes for a fleet of multi-passenger vehicles and having information such as an ordered list of route stops (which in some implementations may correspond to fixed bus stops), an arrival time at each stop and a departure time from each stop. The route planning module 130 also uses a plurality of operator-specific parameters that affect or alter generation of the planned routes and schedules of the routing plan. In some implementations, the operator-specific parameters may be determined when the routing algorithms of the route planning module initialize. In other implementations, the operator-specific parameters can be updated at any time. The operator-specific parameters can comprise, as non-limiting examples:

time-based or distance-based operating costs of the multi-passenger vehicles and/or of the drivers, such as the operating cost per hour for a multi-passenger vehicle and the cost per hour of a driver associated to the multi-passenger vehicle, the overhead cost of dispatching a new vehicle, time frames based on the earliest departure time/latest arrival time in which a passenger may be picked up or dropped off, such as pickup and drop-off time windows, the maximum walking distance or travel time allowed between a passenger's origin or destination location to a bus stop, as it dictates which candidate bus stops may be considered as potential pickup or drop off stops for a given trip request for example. The distance or travel time may also vary from one passenger to another, such as through configuration settings of the passenger mobile application, working shifts of the drivers, such as start and end time of the shifts, break schedules of the drivers and locations where the breaks are to be taken, the geographic area and operating hours of the service and transit network data specific to the operator, and the number of multi-passenger vehicles of the fleet and the load capacities of the vehicles.

The dynamic routing plan generation system 100 and the associated method are advantageous over existing mass transportation solutions since they generate and update a dynamic routing plan that minimizes a weighted combination of the overall operating costs of the multi-passenger vehicles travelling along the routes and service quality metrics, while maintaining a minimum quality of service. The weighted combination can be configured in such a way that it is possible to minimize only one between the operating costs and the service quality metrics or any combination of both. Further, the minimum quality of service is ensured by some operator-specific parameters, such as the maximum walking distance between the origin/destination location and the stop for the trip request, the pickup and drop-off time windows, and the earliest departure time and latest arrival time. based on the operator-specific parameters of the service operator. An objective function, whose value is to be minimized over a set of feasible alternatives, is calculated based on the operating costs and service quality metrics to determine the relevance of a routing plan. For example, when an alternate routing plans are created, the objective function for the alternate routing plans is calculated to determine if the new routing plan is more efficient than the current routing plan. For example, when the value of the objective function for an alternate routing plan is lower than the value of the objective function of the current routing plan, the alternate routing plan becomes the current routing plan.

In exemplary embodiments, the objective function may be defined by the following equation:

routing plan cost=w*(bus operating costs*sum of all route durations)+x*(total buses used)+y*(sum of all passenger trip durations)+z*(total passengers served)

in the foregoing equation, w, x, y and z are tunable parameters or constants, where w>0, x>0, y>0, and z<0, for example. Therefore, the equation considers the duration of the routes (vehicle operating cost) and number of vehicles used (overhead cost for dispatching a vehicle) but also the passenger experience (trip duration) and the number of passengers served. In this embodiment, increasing the number of passengers served lowers the value of the objective function as "z<0". Various additional parameters can be used for calculating the objective function.

The objective function is calculated based at least on one between the operating costs of the multi-passenger vehicles and the service quality metrics, or on any weighted combination of the operating costs and the service quality metrics. The operating costs include, for example, cost per vehicle dispatched, cost per kilometer traveled, cost per unit of time idling, and a stopping cost. The service quality metrics include, for example, reward per trip request accepted, cost per unit of time spent in the vehicle by a passenger, cost per unit of time spent walking, cost per unit of time for a time difference between the requested departure/arrival time and the departure/arrival offered. It will be noted that the operator-specific parameters can also include the operating costs and the service quality metrics detailed herein.

In some embodiments, the system can therefore improve the routing plan in order to minimize passengers trip duration along with the operating costs, for example.

Further, a reward, associated with accepting a new trip request, may be included to the calculation of the objective function when generating or updating the routing plan. This reward must be large enough so as to ensure that the value of the objective function associated to a candidate routing plan accommodating the new trip request is lowered respective to a routing plan not accommodating the new trip request. Therefore, generating a routing plan accommodating the new trip request and further accommodating the trip parameters of all previously accepted trip requests, while respecting all constraints associated with the operator-specific parameters, and respecting committed elements implicitly improves the routing plan, and thus is desirable.

When generating or updating the routing plan, constraints associated with the operator-specific parameters must be respected. Such constraints may include, for example:

a maximum walking distance allowed between the origin location and the pickup stop, and between the destination location and the drop-off stop, the pickup and drop-off time frames selected by the passengers, break schedule of bus drivers, and locations for taking the breaks, limitations regarding the departure and arrival of the drivers from and to the bus depot(s), as all routes should start and end at a bus depot, the location of all vehicles at the bus depot(s) outside of the service operating hours, the operator's selected operating area, the pickup and drop-off needing to respect the selected operating area, the load capacity of each multi-passenger vehicle to be respected, and the updated routing plans that must be compatible with stops already executed or traversed by multi-passenger vehicles and committed elements, such as trip details transmitted to passenger processing devices and stops and route segments transmitted to vehicle processing devices.

When generating or updating the routing plan, only candidate routing plans respecting those constraints are considered.

The route planning module 130 performs this minimization of the objective function, which is calculated from at least one between the operating costs of the fleet and the service quality metrics, by continuously generating routing plans that meet predetermined constraints, such as those listed above, and calculating the objective function with each generated routing plan. The objective function value of a candidate routing plan is evaluated and if it is lower than the objective function value of the current routing plan (the least costly plan generated so far) it becomes the current routing plan. When generating a candidate routing plan, the routing algorithms of the route planning module 130 may deteriorate the cost of a given route of the routing plan if the modification allows for lowering the objective function value for the entire routing plan. Since routing plans are generated while drivers are executing an older plan, certain route segments and/or stops of the routing plan cannot be modified, and the new routing plan must be compatible with those route segments and/or stops of the older routing plan. For example, route segments already executed by the multi-passenger vehicles and route segments and/or stops of the routing plan already transmitted to the vehicle processing device and/or to the passenger processing device, or committed elements, cannot be modified by the route planning module. For example, the committed elements can correspond to the next stop in a given route that cannot change because the details of the stop and the route segment to traverse to reach the stop are already transmitted to a vehicle processing device. Further, the committed elements can correspond to trip details transmitted to a passenger processing device. Conversely, uncommitted elements of the routing plan correspond to route segments and stops that have not been executed or traversed and that further have not been transmitted to the vehicle processing device, and trip details of the routing plan that have not been transmitted to the passenger processing devices. The uncommitted elements can still be modified. In some embodiments, preliminary trip details can be transmitted to a passenger processing device without becoming committed elements since they can still be modified by the route planning module. Further, preliminary stops and route segments, or preliminary routing information, can be transmitted to a vehicle processing device without becoming committed elements as they can still be modified by the route planning module. Details of generating the routing plans are presented later herein with reference to FIGS. 2A and 2B.

In possible implementations, the objective function is minimized as much as possible. In order to obtain a routing plan having an objective function minimized as much as possible, thereby improving the current routing plan as much as possible, a greatest possible number of candidate routing plans must be strategically generated according to the method described herein. Because the process of generating new routing plans and evaluating their objective functions by the planning module 130 is time-consuming and computationally expensive, increasing the length of time provided to the route planning module 130 for processing new routing plans increases the probability of finding a more cost-effective or improved routing plan, and particularly improved uncommitted segments or portions of the routing plan, comprising uncommitted elements. An "improved" routing plan corresponds to a routing plan which decreases the objective function value when compared with the current routing plan. Accordingly, the proposed system and method presented herein is built to provide route details, such as pickup and drop-off time and location, to passengers and to drivers in a "just-in-time" manner, allowing for extending the processing time provided to the route planning module 130 for improving the routing plan. Indeed, until these details are transmitted to the drivers and passengers and therefore become committed elements, they can still be modified by the route planning module. Transmitting, and therefore committing to such details as late as possible thus leaves the route planning module a maximal amount of time to generate new and improved routing plans. However, preliminary trip details and preliminary routing information, such as stops and route segments, can be transmitted without becoming committed elements.

Figure 2:
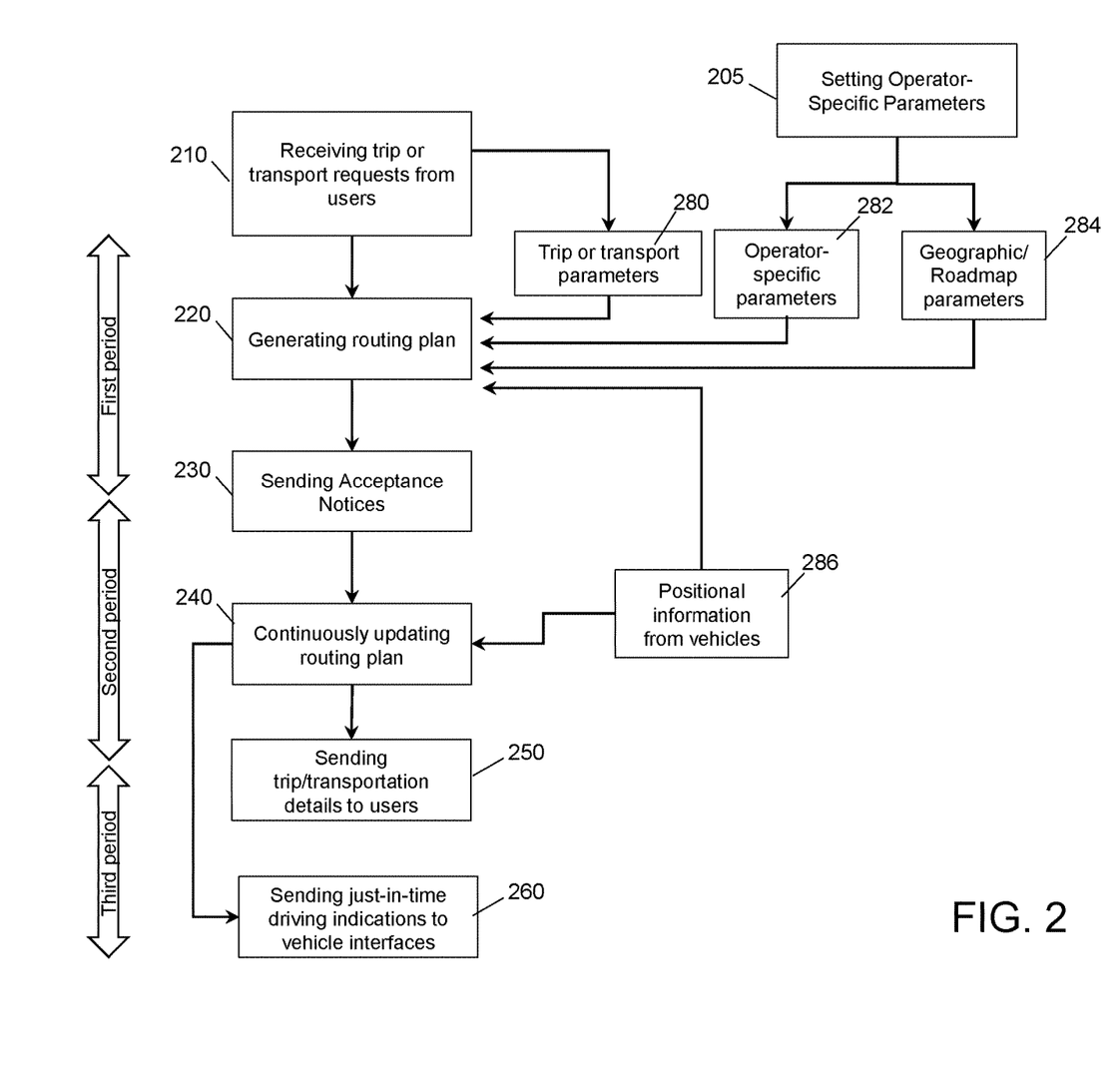
FIG. 2 is a high-level flow chart of the process for generating a dynamic routing plan for a fleet of multi-passenger vehicles

Referring now to the embodiment of FIG. 2, when a new trip request is received at step 210, the route planning module tries to find a new initial routing plan, at step 220, that can accommodate this new trip request based on the trip parameters 280 associated with the new trip request received and based on the operator-specific parameters 282, while still accommodating the trip parameters 280 of all previously accepted trip requests, and without modifying committed elements. The new initial routing plan can be obtained by adding a newly created route to the current routing plan or by modifying the existing routes of the current plan. Other parameters or conditions may be used for generating a new initial routing plan, such as geographic/roadmap parameters 284 that may indicate allowed roads for multi-passenger vehicles, for example. The initial routing plan also needs to be compatible with previously executed or traversed route segments and committed elements of the current routing plan, and the constraints or trip parameters of other previously accepted trip requests. The route planning module uses a first period to determine this initial routing plan. An acceptance or refusal notice is sent to the passenger processing device 230 depending on whether such an initial routing plan can be found. A refusal notice is sent when no routing plan can be found that would meet requirements associated with the trip parameters and the operator-specific parameters 282 while also respecting the route segments already executed or traversed and committed elements of the routing plan, and the constraints of other previously accepted trip requests. This first period may start after the new trip request has been received and ends after the acceptance or refusal notice has been sent to the passenger processing devices. The first period is thus different from one passenger to another. If a trip request is rejected, the refusal notice sent to the passenger processing device may include alternative trip detail suggestions.

In alternative embodiments, if no routing plan that accommodates the trip parameters can be found, the route planning module may modify one or more of the trip parameters, and further attempt to determine a routing plan the meets the modified trip request parameters. The trip parameters may be iteratively modified until a routing plan is found or until a certain limit is reached, such as when a maximum deviation from the original trip parameters is reached, a number of iterations is reached, or the end of the first period is reached, for example. If a routing plan accommodating the modified trip parameters is found, an acceptance notice may be sent to the passenger processing device, along with an indication that the trip parameters have been modified. For example, a pictogram may be used to indicate that one or more trip parameters have been modified. If no routing plan meeting the modified trip parameters can be found, a rejection notice may be transmitted to the passenger processing device.

Once a new trip request has been accepted, the route planning module uses the routing algorithms, during a second period, to iteratively, or continuously, update the routing plan at step 240 to try to find a routing plan with a lower objective function value comparing to the current routing plan. In alternative embodiments, updating the routing plan may be performed only once, or any determined number of times. Updating the routing plan comprises modifying or deleting uncommitted elements of the initial routing plan, such as stops or routes segments of existing routes, and creating new routes, to minimize the objective function which may be calculated using various parameters detailed above, in order to accommodate the trip parameters 280 of the accepted new trip request and the trip parameters 280 of all previously accepted trip requests while respecting all operator-specific parameters 282 and any committed elements. Further, updating the routing plan can comprise deleting old routes when said routes comprise only uncommitted elements. For example, the newly accepted trip request may be removed from the route initially found and inserted into another existing route, the trip details of the trip request, such as pickup and drop-off stops/time, may be modified while leaving the trip request within the route initially found, or a brand-new route may be created. In other words, the continuous update of uncommitted elements of the routing plan can comprise the modification of existing routes, the deletion of entire routes (as long as no segments of such routes have been executed or committed yet) and the creation of entire new routes. Different parameters are considered when updating the routing plan, such as for example the actual positions, or positional information 286, of the different vehicles in operation.

The second period may start after the acceptance notice has been sent and ends at a given time before the earliest departure time associated to a given trip request, such as 15 to 20 minutes before the earliest departure time. At the end of the second period, the details of the trip are transmitted to the passenger at step 250, informing them of the pickup and drop-off bus stop locations, pickup and drop-off times, and vehicle identification, for example. The period between the end of the second period and the pickup time corresponds to a "third" period. In possible implementations, the given time for the end of the second period is configurable via the operator dashboard.

One of the advantages of the proposed method and system lies in the gradual refining of the uncommitted segments, elements or details, that the routing plan will go through for each trip request, from the moment the route planning module receives a trip request to the moment the associated passenger(s) boards the vehicle. Once the second period associated with a trip request ends and the passenger's processing device receives the trip details (i.e., the pickup and drop-off stops/time and the associated vehicle become permanent), the route planning module may still change the associated vehicle's route, as long as the trip details transmitted to the passenger, and any other committed elements of that route, such as transmitted routing information, are not modified, and as long as the changes respect all operator-specific parameters and trip parameters of previously accepted trip requests. Further, the route planning module may modify some of the route stops after the passenger has boarded, as long as drop-off stop/time is respected, and again as long as all the committed elements of the route, the operator-specific parameters and the trip parameters of previously accepted trip requests are respected. This process is designed to leave the routing algorithms of the route planning module as much time as possible to continuously improve the uncommitted elements, portions or segments of the current routing plan, thereby increasing the probability of outputting a routing plan having a lower objective function value than the current routing plan. This is achieved by dividing the delivery of users' trip details by the system into different periods or phases, each phase being described in more detail below.

First, whenever a new trip request is inputted into the system by a user, a decision must be made about whether the system accepts (and therefore commits) to fulfilling this trip request, or if it rejects it because it is impossible to meet constraints associated to the trip request, such as the trip parameters or the modified trip parameters, and any other relevant constraints associated to the current routing plan or the operator-specific parameters. The new trip request can only be accepted if the route planning algorithms can find a new feasible routing plan (i.e., a plan that respects all problem constraints listed earlier) that simultaneously serves this new request, and is compatible with all executed segments. It is therefore possible that such a new request cannot be feasibly added to the current routing plan in memory.

However, the fact that a new trip request does not fit into the current routing plan in memory does not imply the inexistence of other feasible routing plans that might be able to accommodate it. Therefore, because the route planning module is provided with a first period before accepting or rejecting the new trip request, the routing algorithms will try to modify the current routing plan so that the new trip request can be inserted in other feasible routing plans. In contrast with existing on-demand transport platforms, rather than force the route planning module to provide an accept/reject decision for a new trip request "on the spot", a certain delay, the first period (typically lasting a few minutes), is provided before the route planning module communicates the accept/reject decision to the passenger processing device. If the new trip request does not immediately fit in the current routing plan, the algorithm will thus try changing the current routing plan so as to find a new routing plan that both respects all constraints and can serve the new trip request. This advantageously increases the probability that the route planning module will find a new routing plan including the trip request, and further avoids possible delays associated with network congestion or latency, since the system is asynchronous, i.e., the acceptance/rejection decision is made asynchronously.

At the end of this first period, an "accept" or "reject" decision must be made regarding the new trip request. If the system cannot manage to find a single routing plan that can accommodate the new trip during this period, even when modifying the trip parameters, the trip is rejected, and a rejection notice is sent to the user via the passenger mobile application. If the system finds a routing plan that can accommodate the new trip request, the request is accepted; when this is the case, the system henceforth commits to only considering routing plans that can serve the trip in question. Indeed, any updated routing plan at any given moment must always feasibly serve all previously accepted trip requests. However, the current routing plan can still be improved by making modifications regarding accepted trip requests. For example, the route planning module may modify the pickup stop, the drop-off stop, and the time at which the passenger will be picked up and dropped off (as long as it still respects the trip's pick up and drop off time frames) for an accepted trip request for which only an acceptation notice has been sent. Further, the route planning module may change the vehicle serving the trip request in the current routing plan and determine pickup and drop-off stops/time for a new vehicle.

Eventually, a passenger associated with an accepted trip request needs the specific details about the trip to plan accordingly. More specifically, within a reasonable delay prior to earliest departure time, the passenger needs to know exactly the pickup stop/time, the drop-off stop/time, and the vehicle used for the trip. Those details are provided by the system "just in time," i.e., as they are needed by a passenger to plan his trip, thus providing the route planning module with added processing time before trip request details become committed elements for a given accepted trip, since when the details are sent to the passenger processing device and become committed elements, they cannot be modified anymore. For example, the pickup stop, drop-off stop, pickup time (e.g., the pickup time frame is shrunk to a small value, for example 1 minute), drop-off time (e.g., the drop-off time frame is shrunk to a small value, for example 1 minute), and the vehicle serving the trip request are fixed. Therefore, these details are only transmitted to the user, and therefore committed, once a certain threshold is reached. For example, the certain threshold can be a time threshold, e.g., 15 to 30 minutes before the earliest departure time associated with the trip request. The second period, which starts at the end of the first period and ends when the trip details are transmitted to the passenger processing device, allows the route planning module as much leeway as possible to improve the current routing plan between the moment a new trip request is accepted and the moment the route planning module must commit to the trip details associated with the trip request, and further allows the passenger enough time to plan their movements according to the received trip details, for example the moment the passenger should leave the house, and which vehicle to be on the lookout for. In some embodiments, preliminary trip details are sent to the passenger processing devices before the end of the second period. These preliminary trip details are not considered committed elements and may still change.

When the passenger does not provide an earliest departure time and instead only a latest arrival time, the system generates an earliest departure time. The generation of the earliest departure time is based in part on the locations of the passenger's origin and destination and further on operator-specific parameters, for example. Correspondingly, when the passenger only provides an earliest departure time, the system generates a latest arrival time.

Once the trip details of the trip request have been transmitted to the passenger processing device, and during a third period associated with the trip request, the route planning module continue to improve the current routing plan, but only routing plans accommodating the committed elements of the trip request, and the trip parameters of all the previously accepted requests, while respecting operator-specific parameters and other committed elements are considered. The third period, starting when the trip details are transmitted and ending when the associated passenger boards the vehicle, allows for further improving the current routing plan, without impinging on the ability of the passenger to plan their movements according to the trip details. An advantage of the system and method is that the most efficient routing plan possible is generated considering the available time, thereby benefiting both the service provider and the users. The proposed system (or platform) allows multi-passenger vehicle fleet operators to operate an on-demand transportation system. It will be noted that the first, second and third periods are associated to individual trip requests and are not periods associated to the route planning module. In other words, the route planning module will continuously try to generate new routing plans but will be constrained, regarding committed elements and trip parameters to be respected and/or accommodated, by the period associated to each of the trip request at any given time.

Referring to FIGS. 1 and 2, the dynamic routing plan generation system 100 thus generally comprises, in addition to the route planning module 130, a passenger mobile application 142 that allows passengers to submit trip requests to the route planning module, and a vehicle/driver application 182, executable for example on a tablet, that guides drivers through the routes and schedules generated by the routing algorithms by displaying turn-by-turn navigation instructions. The dynamic routing plan generation system 100 further comprises a server 110 comprising the route planning module 130 and configured to relay information between the route planning module 130 and the passenger mobile application 142 and driver application 182. In some embodiments, a server for relaying the information can be external to the server comprising the route planning module 130 configured for communicating with a database 120 storing data related to the routing plan. For example, the database 120 may store trip parameters 280 of all new and previously accepted trip requests, the operator-specific parameters 282, the acceptance and refusal notices, the trip details, and the at least next stop and the route segment associated to each of the multi-passenger vehicles. Therefore, the database 120 is in communication with the route planning module, the application interface, the vehicle application, and the operator-dashboard interface. The system also comprises an operator-dashboard interface 160 with which a fleet operator can input the operator-specific parameters 282 of the routing algorithms, for example a maximum walking distance of a passenger, driver shifts, and service operating area. The operator-dashboard interface 160 further allows for monitoring key metrics via a dashboard or graphical user interface. The operator-dashboard interface 160 can be operatively connected to the server 110, or in alternative embodiments, integrated to the server 110.

When the fleet operator wishes to implement an on-demand service using the dynamic routing plan generation 100, the transport operator first configures the service according to their needs (step 205 in FIG. 2). Operator-specific parameters 282 are inputted through the operator-dashboard interface 160. The operator-specific parameters 282 are used to configure an instance of the routing algorithms of the route planning module 130 for the fleet operator. The vehicle/driver application 182 is executed on, or accessed by, vehicle processing devices 180, such as tablets mounted inside their vehicles. These tablets are configured to display the routes generated by the instance of the route planning module as configured by/for the fleet operator. Further, a passenger application 142 may be installed on passenger processing devices of potential passengers. The passengers use the application 142 to submit trip requests to the server 110, which may be hosted on a centralized server or one or more virtual distributed servers, such as cloud-based servers, that directs the trip requests to the mobile application interface of an appropriate instance route planning module 130, depending on the nature of the trip request. Finally, the instance of the routing algorithms generates a routing plan comprising routes based on the trip requests received. According to the different phases as detailed hereinabove, routing information such as route segments and stops are then relayed to the vehicle processing devices 180 installed in the appropriate fleet operator's vehicles to be executed by the multi-passenger vehicles (step 260 in FIG. 2). For example, the routing information transmitted to the bus drivers may include only a given number of next stops to be visited a route segment indicating roads to follow to reach a next stop, since subsequent stops and route segments of the route are likely to be further modified by the route planning module, given the continuous updating of the routing plan. For each stop transmitted to the vehicle processing device, the routing information can contain a name or identification of the stop, arrival and/or departure time associated with the stop, and a list of passengers to be picked up and/or dropped-off at that stop. In some embodiments, preliminary routing information, such planned stops and route segments of the entire route, may be transmitted, in addition to the routing information transmitted, to the vehicle processing device without being considered as committed elements, such as for creating a preview, for example.

As can be appreciated, the dynamic routing plan generation system 100 allows different fleet operators to operate an on-demand service. Different transport operators can operate in potentially overlapping areas using instances of the routing algorithms that are specifically configured for each transport or fleet operators, for example by having their own operator-specific parameters or settings. The routes and schedules generated by a particular instance of the routing algorithms are transmitted only to the vehicle processing devices 170 that are part of an associated fleet operator.

Figure 3A:
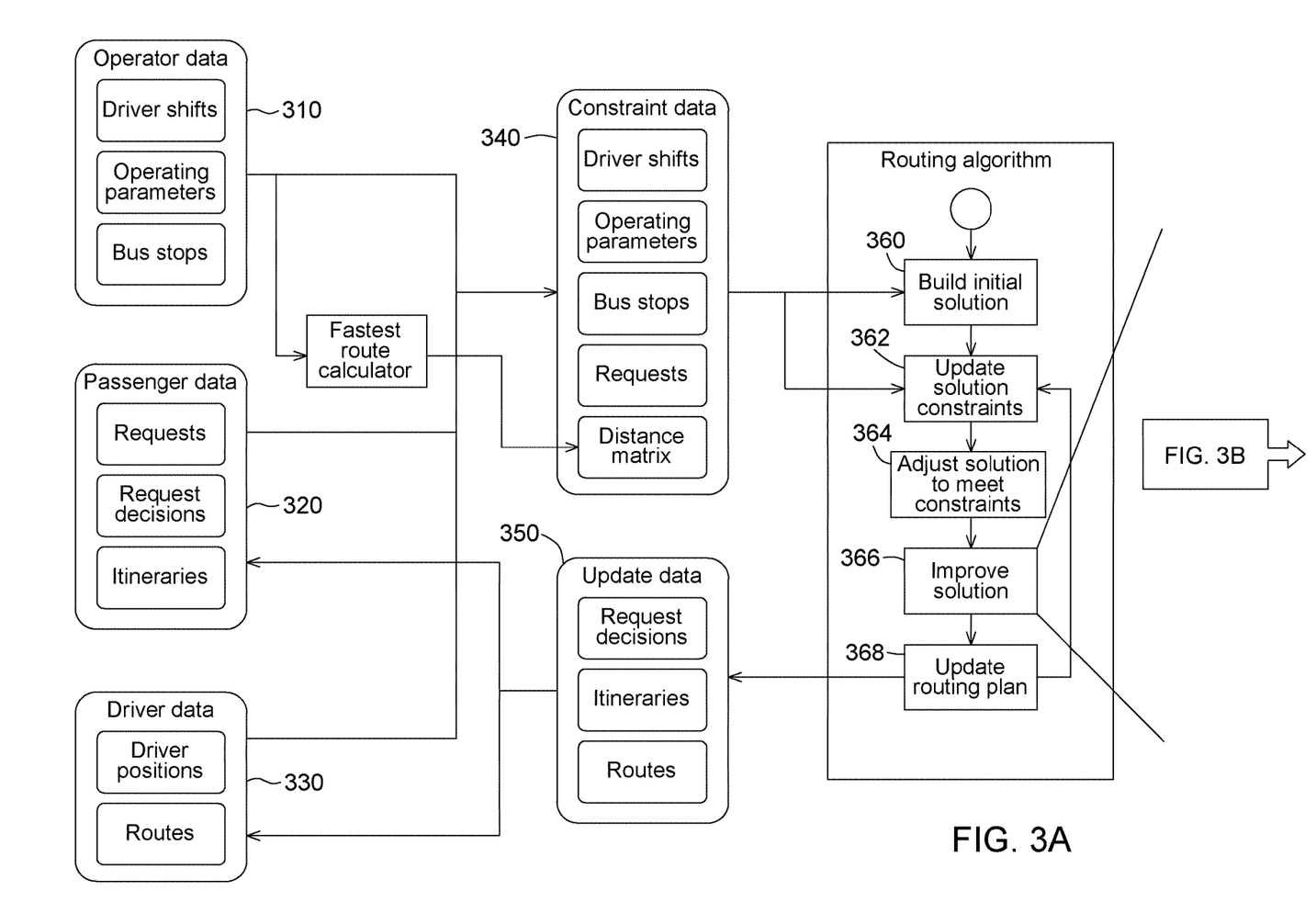
FIG. 3A is a flow chart diagram illustrating how data from different sources is used in the process of generating a dynamic routing plan for a fleet of multi-passenger vehicles.

Referring now to the embodiments of FIG. 3A, dataflow and data types between different data sources used by the algorithms of the route planning module 130 are schematically illustrated. Operator data 310 is inputted by the fleet operator through the operator-dashboard interface 160 and comprises at least the operator-specific parameters 282 for the routing algorithms and other data specific to that fleet operator's service. Passenger data 320 is inputted by or displayed to the passenger through the mobile application 142. The passenger uses the mobile application to submit trip requests. The mobile application displays the decisions for those trip requests (i.e. accept/reject) and details about those trips that are accepted (i.e. pick up/drop off time and stop as well as the vehicle that will serve them). Driver data 330 is inputted by or displayed to the driver by the vehicle processing device through the vehicle application 182. As the driver follows his route, the vehicle application 182 sends to the dynamic routing plan generation system 100 the stops that have been reached along with the time at which they were reached. Further, the vehicle application 182 receives the upcoming stops in the route. For example, when arriving at a given stop, the vehicle application 182 will display the next two stops along the route followed by the driver. The operator, passenger and driver data together form constraint data 340, which is considered by the routing algorithms of the route planning module when generating the initial and updated routing plans. Update data 350 results from the generation of routing plans and is transmitted to either passenger processing devices 140 or vehicle processing devices 180 using the respective applications 142, 182, according to the different periods.

The present dynamic routing plan generation system 100 allows for moving passengers between locations based on corresponding trip requests, and such trip requests can arrive dynamically while executing existing routes. Therefore, the routing algorithms of the route planning module must solve dynamic dial-a-ride problems (DARP) having additional context-specific features, for example the possibility to select the pickup and drop-off locations of a given trip request out of a set of candidate locations. As previously discussed, a trip request comprises an origin point, a destination point, and a time frame for when either the pickup or drop-off can occur. Candidate locations can therefore be determined as a subset of existing bus stops in the transit network that respect criteria based on the origin and destination points of a given trip request. For example, every bus stop within a walking distance of 500 m from the origin location and from the destination location may be kept as candidates for pickup and drop-off stops, respectively.

A fleet of multi-passenger vehicle must be routed to serve as many trip requests as possible. However, it is possible that not all trip requests need/can be served, since the route planning module generates routing plans based on various constraints. The objective is thus to find a feasible set of routes, or routing plan, that serves as many trip requests as possible, while minimizing the cost incurred to serve these trip requests and respecting all problem constraints detailed hereinabove, such as for example the load capacity of the buses, the time frame associated with each accepted trip request, the time frames associated with driver shifts, and the need for driver breaks in certain locations after a certain amount of time on the road.

Figure 3B:
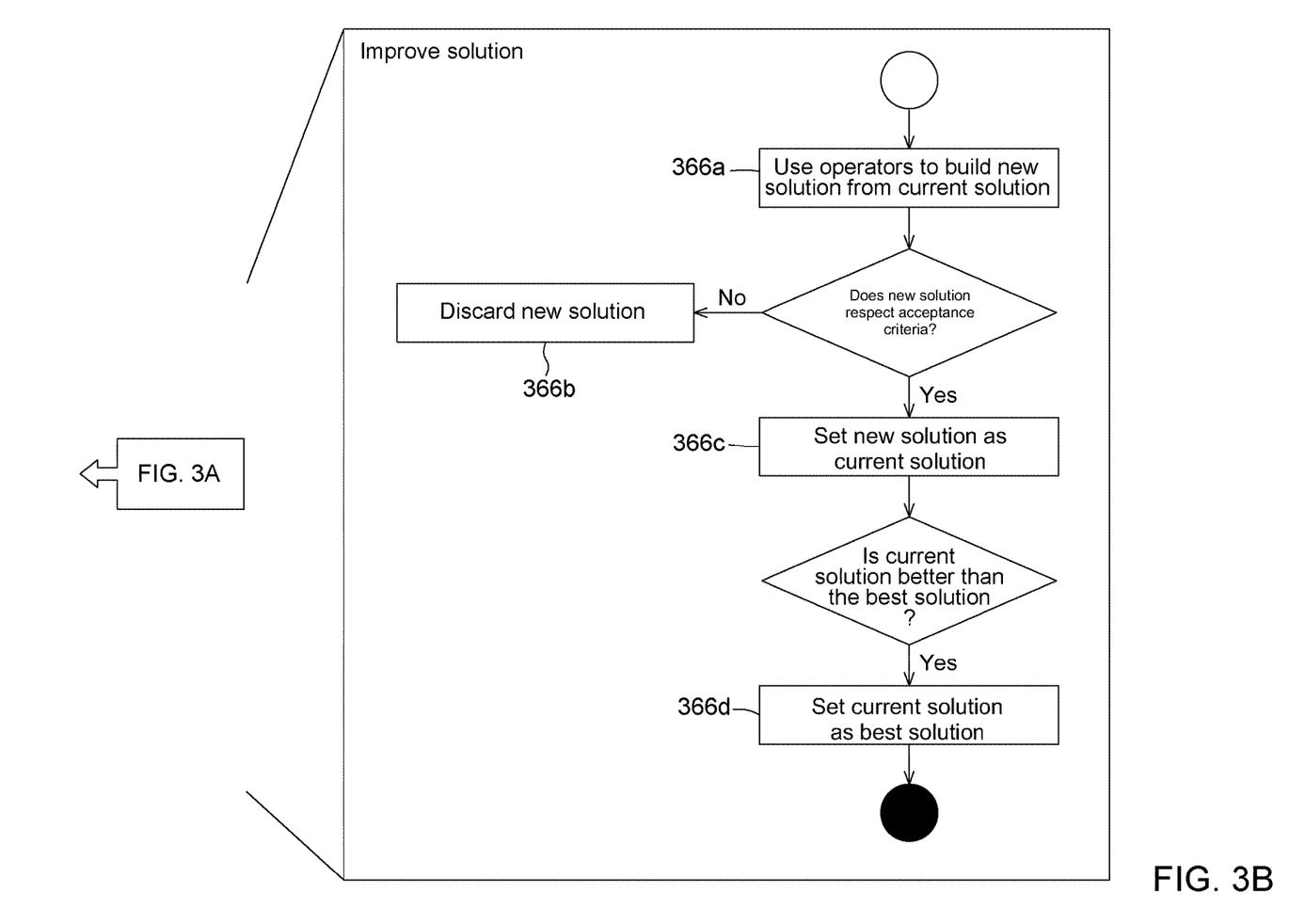
FIG. 3B is a flow chart diagram illustrating steps of generating a new routing plan, according to a possible embodiment.

Referring to FIGS. 3A and 3B, due to the complexity of the routing problem of finding a cost-effective routing plan, the route planning module 130 uses, in a possible implementation, a heuristic framework 132 (identified in FIG. 1), which comprises sets of algorithms that can quickly generate high-quality solutions, or solutions having a low objective function value, but cannot guarantee that the returned solution is optimal. The heuristic framework comprises the steps 360-368 described herein. First, the route planning module 130 generates a first initial route or routing plan at step 360 based on any trip requests known upon initialization, such as trip requests for which the reservation was received during a previous day for example. This first solution, or routing plan, serves as a starting point and does not necessarily need to be close to optimal. For example, the initial routing plan may not minimize the objective function. In generating the first initial routing plan, steps 362 and 364 may be skipped. At step 366, the solution is modified using the routing algorithms. As shown in FIG. 3B, predefined acceptance criteria are used to determine if changes to the current solution should be kept or discarded, namely such that changes that lead to a better solution (a solution having a lower objective function value when compared to the current solution), for example changes that decrease the objective function value of the current solution, are always kept (i.e., the new solution will become the current solution in step 366*c*), while other changes that lead to worse solutions may be discarded at step 366*b*, or occasionally kept at step 366*c*, as it may be beneficial to temporarily generate an intermediate solution of lesser quality in order to find an even better one later on in the algorithm's search process, as will be explained below. The new solution is thus always compared with the current solution immediately after step 366*a*, such as by comparing the objective function value obtained by each solution, and if the new solution respects the acceptance criteria, it becomes the current solution. Further, the current solution is compared with the best solution, which always corresponds to the current routing plan, and if the current solution is better than the best solution, it becomes the new best solution at step 366*d*, and the routing plan will therefore be updated at step 368. In this context, a "solution" refers to an instance of a routing plan determined by the routing algorithms. but that is not necessarily the current routing plan executed in real life by the fleet of multi-passenger vehicles. In further iterations of the routing algorithms, new or updated constraint data 340 is inputted in the route planning module at step 362, and the routing plan may be adjusted to respect the constraint data at step 364, for example when trying to integrate a new trip request into the current routing plan. For example, the updated constraint data can comprise new trip requests and associated trip parameters, stops visited by the drivers of the multi-passenger vehicles (executed segments of one or more routes of the routing plan), stops and stop details that were transmitted to the drivers (committed route segments and stops of the routing plan), and trip details transmitted to passenger processing devices (committed trip details).

In a possible implementation, the heuristic framework 132 used is an Adaptive Large Neighborhood Search (ALNS) heuristic framework. However, it will be noted that other types of frameworks can be used in alternative embodiments. Using the ALNS framework, an initial routing plan is first built using a simple construction heuristic and the framework is therefore initialized with this initial routing plan as the current solution to the problem. Then, for each iteration, the ALNS framework destroys large portions of the current solution by removing a certain number of trip requests from the current solution, and subsequently repairs the remaining partial route segments or creates new routes to find a new solution by reinserting the removed requests in a different way. This "destroy and repair" process, steps 366a, allows the routing algorithms to significantly alter the current solution in hopes of finding even better solutions than the best one currently known. In the present application, a better solution corresponds to a solution having a lower objective function value when compared to another solution. In a possible implementation of the dynamic routing plan generation system 100, the ALNS heuristic framework 132 achieves this by using several destroy and repair operators 134. As an example, a Worst Removal destroy operator may iteratively remove a trip request currently in the solution and whose removal would reduce routing costs the most and repeat this operation until a predetermined number of trip requests have been removed. As another example, a Greedy Insertion repair operator may iteratively select, out of all trip requests not currently in the solution, the one whose optimal (and feasible) insertion causes the smallest increase in total cost, and insert it into the current solution accordingly (until no more requests may be feasibly inserted). By optimal insertion, it is meant an insertion which has a lowest increase in total cost from different possible insertions. In each iteration, the ALNS heuristic framework 132 can decide which destroy and repair operator 134 to apply based on selection probabilities. For example, there may be multiple destroy operators and multiple repair operators, and the framework therefore selects one of each to use on a given iteration. This selection process is stochastic. Each operator has a certain probability of being selected. This probability can be fixed (for example, even across all operators) or dynamically changed as the routing algorithms are run, such as after a given number of iterations or based on a state of the routing plan. The state of the routing plan may for example take into account the current position of each multi-passenger vehicle, or traversed segments of the routes of the routing plan. For example, if the multi-passenger vehicles have started executing or traversing all the routes of the routing plan, some operators that remove entire routes cannot be used as all the routes will have traversed segments. Moreover, in possible implementations, the probability of selecting a given operator during an iteration may be dynamically updated through an adaptive mechanism while the routing algorithms run, thereby allowing operators that perform well on a given dataset to be used more frequently. The adaptive mechanism may comprise the framework keeping track of which operators are used when a better routing plan is produced. These operators are then prioritized on subsequent iterations by increasing the associated probability of being selected again. Additionally, the probability of being selected may be decreased for operators which do not produce better routing plans. It will also be noted that other types of operators can be used to refine the routing plan.

In a possible embodiment, each iteration begins by choosing, by the route planning module, a pair of destroy and repair operators to modify the current solution and get a new solution, at step 366a. Several local search operators, or algorithms, can then be applied to the solution resulting from the destroy-repair phase of each iteration when the solution respects certain conditions. For example, the local search operators will be applied to a solution when the value of the objective function of this solution, after the destroy-repair phase, is at most a given percentage worse than the best solution found thus far, corresponding to the current routing plan. The local search operators may be used to modify the new solution in a more refined way than the destroy-and-repair operators. For example, a possible refinement may consist in taking a single trip request from a route and relocating it to another route, or by swapping two trip requests between two different routes. Other local search operators known in the art may be used. At the end of each iteration, for example after a destroy-repair phase and an optional local search phase, the route planning module determines if the new solution is kept (steps 366c-366d) or discarded (step 366b), that is if the next iteration will use this solution as a starting point (step 366c) or not and further if the new solution will become the best solution, therefore the current routing plan (step 366d). Indeed, it is possible that a solution having a higher objective function value than the best solution will be kept for future iterations as it may lead, through iterations, to a solution having a lower objective function value than the best solution. In possible implementations, this decision can be guided by a simulated annealing mechanism to simultaneously prioritize solutions that improve the current one and allow deteriorating solutions to be occasionally accepted in order to reach otherwise unreachable zones of the solution space of all feasible routing plans. However, at any given moment, the routing plan executed in reality is the least costly solution found thus far by the ALNS that meets all current problem constraints and commitments, which change with time as new trip requests are made and drivers execute or traverse portions of routes. In summary, at the end of each iteration, for example after a destroy-repair phase and an optional local search phase, the route planning module determines if the new solution is kept or discarded according to some acceptance criteria of the route planning module, that is whether the next iteration will use this new solution as a starting point, thereby becoming the current solution, and whether the new solution will become the best solution and therefore the current routing plan.

Given that the requests arrive in real time, any new routing plan must respect all constraints and route segments that have already been executed or traversed by the vehicle processing devices and all committed elements. The routing algorithms are therefore implemented as an endless loop that continuously tries to improve the current routing plan and responds to real-time events. The steps 360, 362, 364, 366 and 368 are therefore repeated endlessly while the system is in operation. Alternatively, the steps 360-368 may be looped a limited number of times, for example until no improvement is found after a number of iterations. Each pass through this loop comprises responding to any real-time events that have occurred since the last pass through the loop and running an iteration of the ALNS framework. The ALNS iteration, however, can only modify unexecuted route segments and uncommitted elements of the routing plan, comprising uncommitted route segments.

Aside from running the ALNS iteration, each pass through of the loop includes verifying if data associated to a multi-passenger vehicle needs, such as route segments and stops, to be transmitted to the multi-passenger vehicle, and accordingly become committed elements. For example, if the route planning module has determined that a new route will be served by a given multi-passenger vehicle, the system relays the information through the vehicle processing device to the concerned driver so that they get ready to depart the depot where they are located. Further, while progressing through a given route, information regarding next stops and route segments of the route needs to be transmitted to the multi-passenger vehicle by the route planning module. For example, upon arriving at a stop, the vehicle processing device transmits information regarding the arrival of the multi-passenger vehicle to the system, and accordingly the system transmit routing information comprising a given number of next stops of the route to the vehicle processing device based on the current routing plan, and additional information such as the expected arrival time and departure time from each stop, and if a break has to be taken at any of these stops, for example. Once route segments and stops are transmitted and are not considered preliminary routing information, they become committed elements, and the route planning module may then only modify segments of the route that are beyond this given number of next stops. In some embodiments, a number of next stops may be transmitted to a vehicle processing device, but the route segments linking those stops are not transmitted. Those route segments can therefore still be modified and are not committed elements. In a possible embodiment, when a multi-passenger vehicle arrives at a next destination of the route, the arrival time is communicated to the system, which may determine that any users' trip details can no longer be respected due to late arrivals. For example, pickup time may be delayed, and the system will notify the passenger through the passenger processing device accordingly.

The system may also verify if any trip requests have been cancelled and remove them from the current routing plan in memory and disregard them henceforth. Further, if any new trip requests are received, the route planning module will try to quickly insert them into the current routing plan during the first period. When this succeeds, the trip request is accepted immediately, and the route planning module will only generate new routing plans that can accommodate this trip request. However, when unsuccessful, a counter, such as a 2-minute delay, part of the first period, is initiated and the route planning module will try inserting the new trip request into the routing plan by generating, using iterations of the ALNS framework, routing plans accommodating the trip parameters of the trip request. Further, the route planning module may modify the trip parameters to find a routing plan that accommodates the trip request. At the end of the first period, when the counter expires or as soon as a routing plan accommodating the new trip request has been generated, an accept or reject decision is transmitted according to whether a routing plan was found that can accommodate the new trip request or not. Once the trip request is accepted, a second period associated to the trip request begins and the route planning module continues to process iterations (i.e., tries to generate new and better routing plans that accommodate all previously accepted trip requests and respects operator-specific parameters and committed elements) and the system continues to verify if any real-time events require a response. Eventually, one of such real-time events will be the end of the second period associated to the trip request (i.e., some amount of time before the trip request's earliest departure time), and the route planning module may attempt to modify the trip details (i.e., pickup stop and time, drop-off stop and time, and assigned vehicle) of the trip request one last time to improve the current routing plan. The system subsequently transmits the trip details to the associated passenger's processing device, and these trip details may no longer be changed in subsequent ALNS iterations as they become committed elements.

In some embodiments, there may be some initial trip requests which are known prior to initializing the ALNS framework. Prior to entering the route planning module's endless loop, an initial routing plan can be built by running the ALNS framework-based algorithm in a "static" mode, for all trip requests that are already known at the start of the operating day. Some trip requests may be rejected if a routing plan accommodating the trip parameters of those trip requests cannot be found.

As can be appreciated, the proposed process for generating, in real time, a dynamic routing plan for a fleet of multi-passenger vehicles, gradually refines the details of the routes, and transmit the routing plan details over time, thereby committing to those details. The process of gradually revealing information affords the routing algorithms more time to improve the routing plan. The complexity of the algorithms of the route planning module is significant, as it must manage trip requests in different states or periods of refinement and keep track of deadlines when details, such as routing information and trip details, must be transmitted, in addition to simultaneously keeping track of and iteratively directing vehicles as they progress through their routes.

While the above description was made in the context of passenger transport operators, the routing algorithms can be applied to any context that requires the real-time planning of optimal routes in which people or goods must be picked up from some locations and dropped off in other locations. The technology can thus be applied to good distribution contexts straightforwardly. Moreover, since the platform already handles the more complex feature of having to choose the pickup and drop off locations out of candidate locations for each trip request, it can be used for door-to-door on-demand transportation as well, or on-demand approaches that allow the user to select his or her pickup and drop off stops themselves.

While the above description provides examples of the embodiments, it will be appreciated that some features and/or functions of the described embodiments are susceptible to modification without departing from the principles of the operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A method for generating, in real time, a dynamic routing plan for a fleet of multi-passenger vehicles, the method comprising:
   receiving new trip requests from a plurality of passenger processing devices, each new trip request comprising trip parameters including an origin location, a destination location and at least one of an earliest departure time and a latest arrival time;
   during a first period associated with each new trip request:
   generating a routing plan for the fleet, the routing plan including routes for one or more of the multi-passenger vehicles, each route comprising an ordered list of route stops and at least one of an arrival time and a departure time associated with each route stop, the routing plan being generated based on the trip parameters of the new trip requests and on trip parameters of previously accepted trip requests and being further based on operator-specific parameters, and
   individually accepting a given one of said new trip requests when a routing plan accommodating the trip parameters thereof is generated;

during a second period associated with each accepted trip request and subsequent to the first period associated with the accepted trip request:
  updating the routing plan to minimize an objective function representative of a relevance of the routing plan, the objective function being calculated based on at least one of the operating costs and service quality metrics,
  transmitting to a passenger processing device associated with the accepted trip request, trip details according to the routing plan, the trip details comprising a pickup stop, a pickup time, a drop-off stop, a drop-off time, and a vehicle identification, whereby waiting for the second period to transmit the trip details to the passenger processing device allows for improving the dynamic routing plan, and
  the routing plan further including committed elements which are unmodifiable when the routing plan is generated or updated, the committed elements including at least the trip details transmitted during the second period; and
  transmitting, to each of a plurality of vehicle processing devices associated with the fleet of multi-passenger vehicles, routing information comprising route segments and stops of the routes to be traversed by the multi-passenger vehicles, including for at least one of the vehicle at least a next stop and a route segment for the vehicle to traverse to reach the next stop, the committed elements further comprising the transmitted routing information.

2. The method according to claim 1, wherein generating the routing plan comprises generating an initial routing plan accommodating the trip parameters of the new trip request and respecting the operator-specific parameters while accommodating all the trip parameters of the previously accepted trip requests, the initial routing plan leaving all executed route segments and the committed elements unmodified, the executed segments corresponding to route segments traversed by the multi-passenger vehicles.

3. The method according to claim 1, wherein when the given one of the new trip requests is accepted, an acceptance notice is transmitted to the passenger processing device associated with the new trip request, and wherein when no routing plan accommodating the trip parameters of the new trip request can be generated, a refusal notice is transmitted to the passenger processing device.

4. The method according to claim 3, wherein when no routing plan accommodating the trip parameters of the new trip request can be generated, the trip parameters of the new trip request are modified allowing for generating, during the first period, a routing plan accommodating modified trip parameters of the new trip request, wherein the acceptance notice is transmitted when the routing plan accommodating the modified trip parameters of the new trip request is generated, the acceptance notice including an indication that the trip parameters have been modified, and wherein the refusal notice is transmitted when no routing plan accommodating the modified trip parameters of the new trip request can be generated.

5. The method according to claim 3, wherein the first period starts after a new trip request has been received and ends after one of the acceptance notice and the refusal notice has been transmitted to the passenger processing device, the first period being different for each new trip request.

6. The method according to claim 3, wherein the second period starts after the acceptance notice has been transmitted to the passenger processing device and ends at a given time before the pickup time.

7. The method according to claim 1, wherein updating the routing plan comprises at least one of:
  modifying uncommitted elements of the routing plan,
  creating new routes, and
  deleting old routes comprising unexecuted segments and uncommitted elements, the unexecuted segments corresponding to route segments untraversed by the multi-passenger vehicles.

8. The method according to claim 7, wherein updating the routing plan further comprises evaluating an objective function of each of a plurality of alternate routing plans comprising one or more alternate routes, and updating the uncommitted elements of the routing plan with one or more alternate routes of one of the alternate routing plans when:
  a value of the objective function of the one of the alternate routing plans is lower than a value of the objective function of the routing plan; and
  the one of the alternate routing plans accommodates trip parameters of all accepted trip requests and respects the operator-specific parameters.

9. The method according to claim 8, wherein the one of the alternate routing plans accommodates the trip parameters of all the accepted trip requests when:
  pickup stops and drop-off stops are within a predetermined distance and/or travel time from origin locations and destination locations associated with all the accepted trip requests; and
  arrival time at and/or departure time from each of the route stops correspond with earliest departure time from and/or latest arrival time of trip requests associated to the route stops.

10. The method according to claim 7, wherein updating the routing plan further comprises iteratively updating the uncommitted elements of the routing plan before the end of the second period by modifying at least one of a pickup stop, a drop-off stop, a pickup time, a drop-off time, an ordered list of route stops, and a multi-passenger vehicle associated to one or more routes.

11. The method according to claim 1, wherein updating the routing plan is performed continuously.

12. The method according to claim 2, wherein generating the route plan further comprises identifying, for each of the new and accepted trip requests, a subset of pickup stops and a subset of drop-off stops from a plurality of candidate stops, the subset of pickup stops and the subset of drop-off stops being within a predetermined distance and/or travel time from the origin location and the destination location, respectively, of the trip request, and generating therefrom the routing plan, the subset of pickup stops and the subset of drop-off being used to generate alternate routing plans.

13. The method according to claim 7, wherein modifying the uncommitted elements of the routing plan is performed by iteratively changing current routes of the routing plan, removing the current routes of the routing plan and/or creating new routes using selected heuristic algorithms.

14. The method according to claim 13, wherein a selection process of the selected heuristic algorithms for changing the current routes, removing the current routes and/or creating the new routes plan, is stochastic and is updated after a given number of iterations is reached and/or based on a state of the routing plan.

15. The method according to claim 1, wherein the operator-specific parameters comprise at least one of time-based operating costs of the multi-passenger vehicles and/or of associated drivers, distance-based operating costs of the multi-passenger vehicles and/or of the associated drivers, working shifts of the associated drivers, break schedules of the associated drivers, overhead costs of dispatching a new multi-passenger vehicle, geographic area of a transport operator associated to the fleet of multi-passenger vehicles, a number of multi-passenger vehicles in the fleet, a capacity associated to each of the multi-passenger vehicles, and transit network data.

16. The method according to claim 1, wherein the pickup stops and the drop-off stops are predetermined fixed bus stops assigned to a transport operator associated to the fleet of multi-passenger vehicles.

17. A non-transitory storage medium storing processor-readable software instructions thereon that when executed by a processor, cause the processor to perform the steps of:
receiving new trip requests from a plurality of passenger processing devices during a first period associated with each new trip request, each new trip request comprising trip parameters including an origin location, a destination location and at least one of an earliest departure time and a latest arrival time;
during a first period associated with each new trip request:
generating a routing plan for the fleet, the routing plan including routes for one or more of the multi-passenger vehicles, each route comprising an ordered list of route stops and at least one of an arrival time and a departure time associated with each route stop, the routing plan being generated based on the trip parameters of the new trip requests and on trip parameters of previously accepted trip requests and being further based on operator-specific parameters, and
individually accepting a given one of said new trip requests when a routing plan accommodating the trip parameters thereof is generated;
during a second period associated with each accepted trip request and subsequent to the first period associated with the accepted trip request:
updating the routing plan to minimize an objective function representative of a relevance of the routing plan, the objective function being calculated based on at least one of the operating costs and service quality metrics, and
transmitting to a passenger processing device associated with the accepted trip request, trip details according to the routing plan, the trip details comprising a pickup stop, a pickup time, a drop-off stop, a drop-off time, and a vehicle identification, whereby waiting for the second period to transmit the trip details to the passenger processing device allows for improving the dynamic routing plan, the routing plan further including committed elements which are unmodifiable when the routing plan is generated or updated, the committed elements including at least the trip details transmitted during the second period; and
transmitting, to each of a plurality of vehicle processing devices associated with the fleet of multi-passenger vehicles, routing information comprising route segments and stops of the routes to be traversed by the multi-passenger vehicles, including for at least one of the vehicle at least a next stop and a route segment for the vehicle to traverse to reach the next stop, the committed elements further comprising the transmitted routing information.

18. A system for determining, in real time, a dynamic routing plan for a fleet of multi-passenger vehicles, the system comprising one or more servers comprising:
an application interface configured to receive new trip requests from a plurality of passenger processing devices, each new trip request comprising trip parameters including an origin location, a destination location and at least one of an earliest departure time and a latest arrival time;
an operator-dashboard interface for inputting operator-specific parameters, the operator-specific parameters including at least operating costs of the multi-passenger vehicles; and
a route planning module for generating, during a first period associated with each new trip request, a routing plan for the fleet, each route in said routing plan comprising at least a list of route stops to visit, an arrival time and/or a departure time at each route stop, each route in said routing plan being generated based on the trip parameters of the new trip requests and on trip parameters of previously accepted trip requests, each route being further based on operator-specific parameters, the operator-specific parameters including at least operating costs of the multi-passenger vehicles,
the application interface configured for sending, during the first period associated with each new trip request, notices to the plurality of passenger processing devices, acceptance notices being sent when a routing plan accommodating the trip parameters and the operator-specific parameters can be generated;
the route planning module configured for updating, during a second period associated with each accepted trip request and subsequent to the first period associated with the accepted trip request, the routing plan to minimize at least an objective function associated with the routing plan and being indicative of a relevance of the routing plan, the objective function being calculated based on at least one of the operating costs and service quality metrics;
the application interface configured for sending, during the second period associated with each of accepted trip requests, to passenger processing devices associated with the accepted trip requests, trip details associated with a most recently updated routing plan, the trip details comprising a pickup stop, a pickup time, a drop-off stop, a drop-off time, and a vehicle identification,
the routing plan further comprising committed elements including at least the trip details transmitted during the second period, wherein the committed elements are unmodifiable when generating and updating the routing plan; and
the application interface configured for sending, to each of a plurality of vehicle processing devices associated with the fleet of multi-passenger vehicles, routing information comprising route segments and stops of the routes to be traversed by the multi-passenger vehicles, including for at least one of the vehicle at least a next stop and a route segment for the vehicle to traverse to reach the next stop, the committed elements further comprising the transmitted routing information.

19. The system according to claim 18, comprising a mobile application executable by the plurality of passenger processing devices, the mobile application comprising a passenger interface configured for:
inputting the trip parameters of the trip request including the origin location, the destination location and at least one of the earliest departure time and the latest arrival time;
displaying the acceptance notices and refusal notices; and displaying the trip details comprising the pickup stop, the pickup time, the drop-off stop, the drop-off time, and the vehicle identification.

* * * * *